United States Patent
Patton et al.

(10) Patent No.: US 11,084,975 B1
(45) Date of Patent: Aug. 10, 2021

(54) PROCESS FOR USING SUBTERRANEAN PRODUCED FLUIDS FOR HYDRAULIC FRACTURING WITH CROSS-LINKED GELS WHILE PROVIDING ELIMINATION OR REDUCTION OF FORMATION CLAY STABILIZER CHEMICALS

(71) Applicant: HYDROZONIX, LLC, Conroe, TX (US)

(72) Inventors: Mark Patton, Valinda, CA (US); Jinxuan Hu, Spring, TX (US); Barry Hinton, Brighton, CO (US); Ed Keenan, Indio, CA (US)

(73) Assignee: HYDROZONIX, LLC, Conroe, TX (US)

( * ) Notice: Subject to any disclaimer, the term of this patent is extended or adjusted under 35 U.S.C. 154(b) by 0 days.

(21) Appl. No.: 16/566,743

(22) Filed: Sep. 10, 2019

Related U.S. Application Data

(63) Continuation of application No. 15/442,739, filed on Feb. 27, 2017, now Pat. No. 10,406,492, which is a continuation of application No. 14/451,654, filed on Aug. 5, 2014, now Pat. No. 9,580,640.

(60) Provisional application No. 61/862,243, filed on Aug. 5, 2013.

(51) Int. Cl.
| | |
|---|---|
| C09K 8/66 | (2006.01) |
| C09K 8/88 | (2006.01) |
| C09K 8/84 | (2006.01) |
| C09K 8/68 | (2006.01) |
| E21B 21/06 | (2006.01) |
| E21B 43/26 | (2006.01) |
| B01F 3/08 | (2006.01) |
| B01F 15/00 | (2006.01) |
| G05D 11/13 | (2006.01) |

(52) U.S. Cl.
CPC ............ *C09K 8/665* (2013.01); *B01F 3/0861* (2013.01); *B01F 15/0022* (2013.01); *B01F 15/00422* (2013.01); *C09K 8/66* (2013.01); *C09K 8/685* (2013.01); *C09K 8/845* (2013.01); *C09K 8/887* (2013.01); *E21B 21/062* (2013.01); *G05D 11/132* (2013.01); *B01F 2215/0081* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 3,267,998 | A * | 8/1966 | Simpson | E21B 43/34 166/266 |
| 4,415,032 | A * | 11/1983 | Shu | E21B 43/40 166/266 |
| 2013/0125630 | A1* | 5/2013 | Collins | E21B 43/20 73/64.56 |

* cited by examiner

*Primary Examiner* — John J Figueroa
(74) *Attorney, Agent, or Firm* — Wayne Edward Ramage; Baker Donelson

(57) ABSTRACT

A system and process for defining, blending and monitoring fresh water with subterranean produced formation fluids, with particular constituents of the blended waters being controlled for proper use in gel-type hydraulic fracturing operations. On-site measurements and calculations of clay stabilization replacement, through a Potassium Chloride (KCl) Equivalency calculation, provide feedback on water constituent adjustments that may be needed just prior to the gel-based hydraulic fracturing process. This assures adequate gel cross-linking times, delayed gel cross-linking times, and clay stabilization in the formation to be fractured.

8 Claims, 7 Drawing Sheets

* Pre = before the start of the first stage, when water treated to fill empty working tanks

| KCl Equivalents | Pre* | 1 | 2 | 3 | 4 | 5 | 6 |
|---|---|---|---|---|---|---|---|
| 4% KCl | 16.20% | 8.80% | 5.00% | 11.10% | 9.10% | 10.60% | 5.80% |
| 5% KCl | 28.80% | 15.60% | 8.90% | 19.70% | 16.10% | 18.80% | 10.30% |
| 6% KCl | 41.30% | 22.50% | 12.80% | 28.40% | 23.10% | 27.10% | 14.80% |
| 7% KCl | 53.80% | 29.30% | 16.70% | 37.00% | 30.20% | 35.30% | 19.40% |
| 8% KCl | 66.40% | 36.10% | 20.60% | 45.60% | 37.20% | 43.50% | 23.90% |

| KCl Equivalents | 8 | 9 | 10 | 11 | 12 | 13 | 14 |
|---|---|---|---|---|---|---|---|
| 4% KCl | 6.70% | 6.70% | 6.60% | 10.00% | 8.60% | 6.10% | 7.00% |
| 5% KCl | 11.90% | 11.90% | 11.70% | 17.70% | 15.20% | 10.90% | 12.40% |
| 6% KCl | 17.10% | 17.10% | 16.80% | 25.40% | 21.80% | 15.60% | 17.90% |
| 7% KCl | 22.30% | 22.20% | 21.90% | 33.10% | 28.50% | 20.40% | 23.30% |
| 8% KCl | 27.50% | 27.40% | 27.00% | 40.80% | 35.10% | 25.10% | 28.70% |

FIG. 5

PROCESS FOR USING SUBTERRANEAN PRODUCED FLUIDS FOR HYDRAULIC FRACTURING WITH CROSS-LINKED GELS WHILE PROVIDING ELIMINATION OR REDUCTION OF FORMATION CLAY STABILIZER CHEMICALS

This application is a continuation of U.S. patent application Ser. No. 15/442,739, filed Feb. 28, 2017, which is a continuation of U.S. patent application Ser. No. 14/451,654, filed Aug. 5, 2014, which claims benefit of and priority to U.S. Provisional Application No. 61/862,243, filed Aug. 5, 2013, by Mark Patton, et al., and is entitled to those filing dates for priority. The specifications, figures, appendices and complete disclosures of U.S. Provisional Application No. 61/862,243 and U.S. patent application Ser. Nos. 14/451,654 and 15/442,739 are incorporated herein by specific reference for all purposes.

FIELD OF INVENTION

This invention relates to a system and process for hydraulic fracturing. More specifically, this invention relates to a system and process for cross-linked gel-based hydraulic fracturing during the completion process of oil and gas wells.

BACKGROUND OF INVENTION

Hydraulic fracturing of subterranean formations requires an enormous volume of water to adequately transfer pressure and to provide a transport media for delivering the fracture proppants into the formation. Examples of hydraulic fracturing methods and proppants are disclosed in U.S. Pat. Nos. 7,931,966; 7,938,185; and 8,061,424, all of which are incorporated herein by specific reference in their entireties for all purposes. As water becomes scarcer and scarcer in the world, solutions for utilizing or reusing fluids generated or "produced" from one or more completed wells in a gel-based fracture fluid design of a subsequently to-be-fractured well has been attempted with little success.

Accordingly, what is needed is an improved system for using produced fluids in hydraulic fracturing.

SUMMARY OF INVENTION

In various embodiments, the present invention comprises a system and process for defining, blending and monitoring fresh water (FW) with subterranean produced formation fluids (PF), with particular constituents of the blended waters being controlled for proper use in gel-type hydraulic fracturing operations. The invention comprises on-site measurements and calculations of clay stabilization replacement, through a Potassium Chloride (KCl) Equivalency calculation, to provide feedback on water constituent adjustments that may be needed just prior to the gel-based hydraulic fracturing process. This assures adequate gel cross-linking times, delayed gel cross-linking times, and clay stabilization in the formation to be fractured. Real-time measurements include, but are not limited to, blend ratios (volumetric), boron levels, chloride levels, and Total Dissolved Solids (TDS). Levels of chlorides and boron are measured in the waters to be blended, and then the volumetric ratios of blend can be calculated to successfully allow cross-linking of borate cross-linked gels during real-time hydraulic fracturing operations. By applying specific calculations, as described below, adjustments in volumetric ratios can then be performed for reliable fluid design.

In addition, this invention comprises methods for calculating and monitoring of Potassium Chloride (KCl) Equivalency in order to determine a set or range of produced fluid volume percentage blend limits. The establishment of blend limits then enables the end-user to eliminate or greatly reduce the volume of clay stabilizer chemical that might be used in the absence of this blending process. During the blend monitoring process, confirmation samples are obtained at relevant sample points and real-time TDS values of the blended water are measured and documented as an indicator that (a) the chlorides, and thus water quality, of either the Fresh Water or Produced Fluid are rising or falling; (b) the ratio of the water blend, as defined by the KCL Equivalency calculation, is changing by possible speed (RPM) changes in the fluid pumps or that one of the pumps is failing to transfer its proper volumetric load; or (c) some combination of both (a) and (b).

DESCRIPTION OF THE DRAWINGS

FIG. 5 is a table of calculated blend rates of produced fluid to meet specified KCL Equivalents for different stages.

DETAILED DESCRIPTION OF EXEMPLARY EMBODIMENTS

In various embodiments, the present invention comprises a system and process for defining, blending and monitoring fresh water (FW) with subterranean produced formation fluids (PF), with particular constituents of the blended waters being controlled for proper use in gel-type hydraulic fracturing operations. The invention comprises on-site measurements and calculations of clay stabilization replacement, through a Potassium Chloride (KCl) Equivalency calculation, to provide feedback on water constituent adjustments that may be needed just prior to the gel-based hydraulic fracturing process. This assures adequate gel cross-linking times, delayed gel cross-linking times, and clay stabilization in the formation to be fractured. Real-time measurements include, but are not limited to, blend ratios (volumetric), boron levels, chloride levels, and Total Dissolved Solids (TDS). Levels of chlorides and boron are measured in the waters to be blended, and then the volumetric ratios of blend can be calculated to successfully allow cross-linking of borate cross-linked gels during real-time hydraulic fracturing operations. By applying specific calculations, as described below, adjustments in volumetric ratios can then be performed for reliable fluid design.

In addition, this invention comprises methods for calculating and monitoring of Potassium Chloride (KCl) Equivalency in order to determine a set or range of produced fluid volume percentage blend limits. The establishment of blend limits then enables the end-user to eliminate or greatly reduce the volume of clay stabilizer chemical that might be used in the absence of this blending process. During the blend monitoring process, as seen in FIG. 1, confirmation samples are obtained at Sample Point 3 (SP3) and real-time TDS values of the blended water are measured and documented as an indicator that (a) the chlorides, and thus water quality, of either the Fresh Water or Produced Fluid are rising or falling; or (b) the ratio of the water blend, as defined by the KCL Equivalency calculation, is changing by possible speed (RPM) changes in the fluid pumps or that one of the pumps is failing to transfer its proper volumetric load; or (c) some combination of both (a) and (b).

Figure 1:
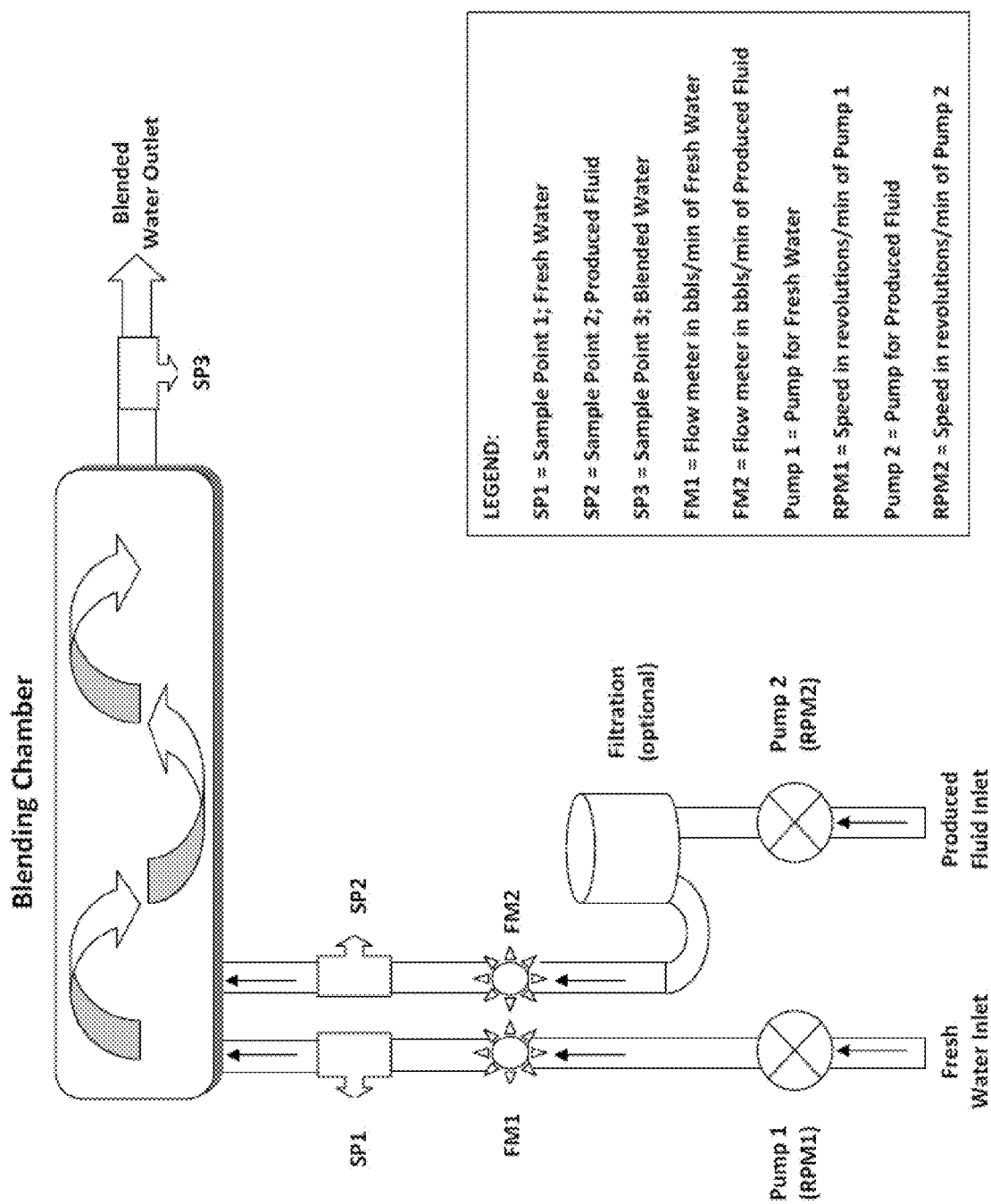
FIG. 1 is a flow diagram of the blending process in accordance with an embodiment of the present invention.
Figure 2:
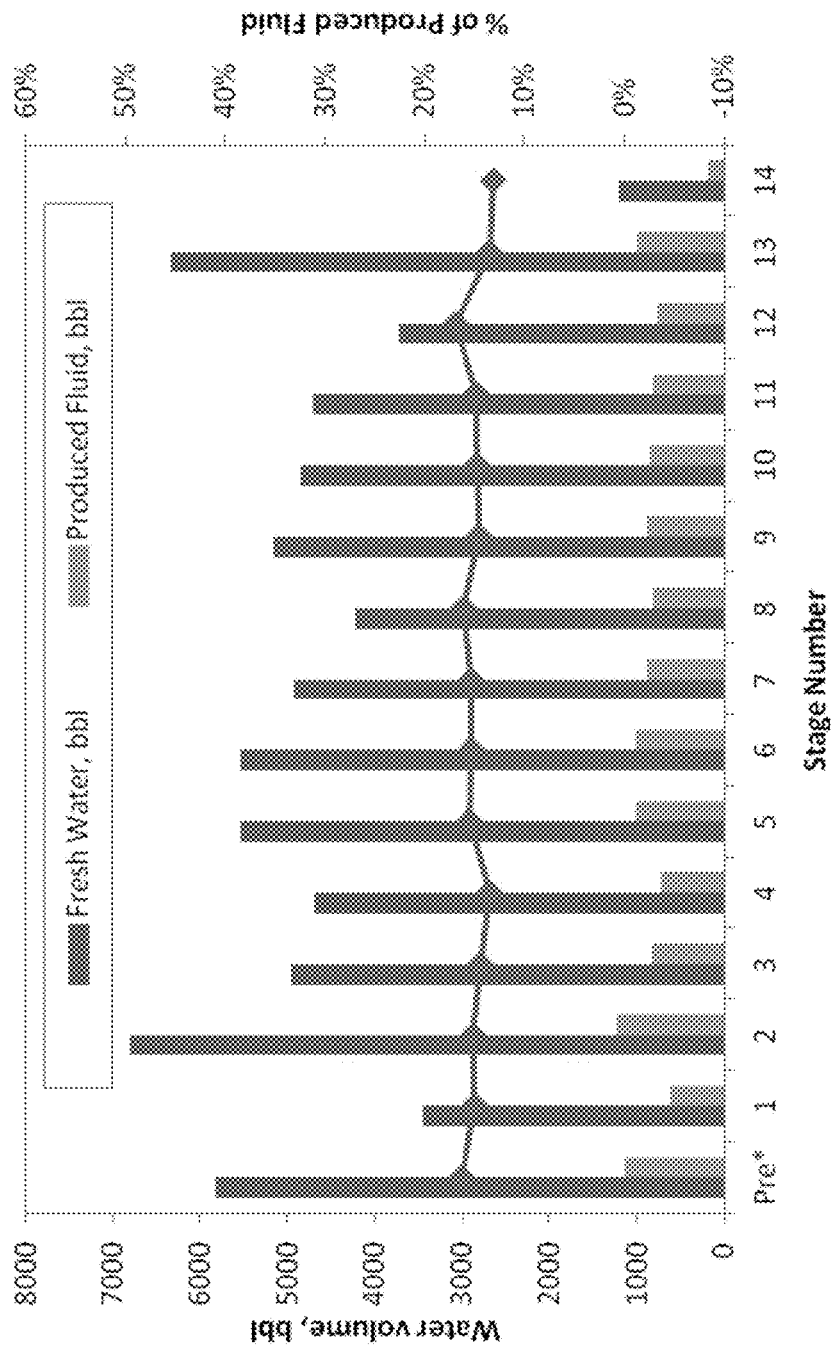
FIG. 2 is an example of a graph of volume of fresh water and produced fluid blended at different stages.
Figure 3:
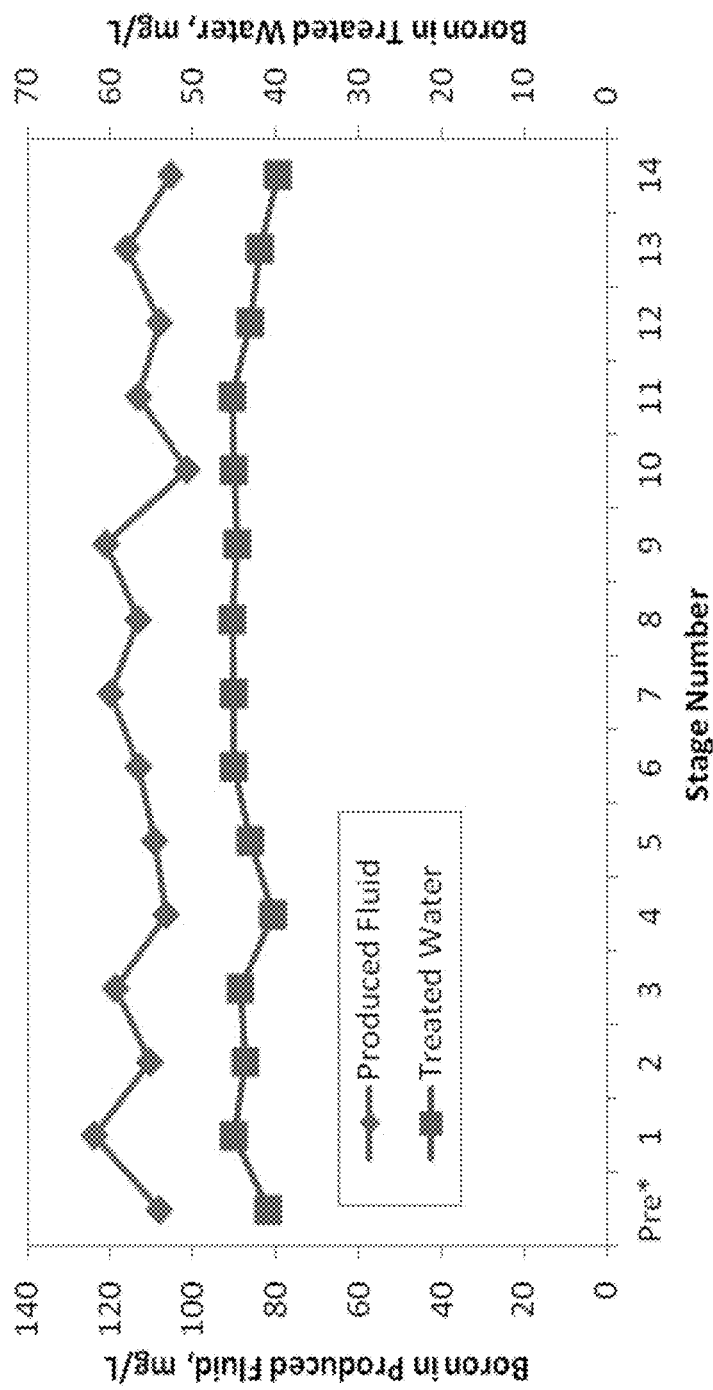
FIG. 3 is an example of a graph of boron concentration in produced fluid and blended water at different stages.
Figure 4:
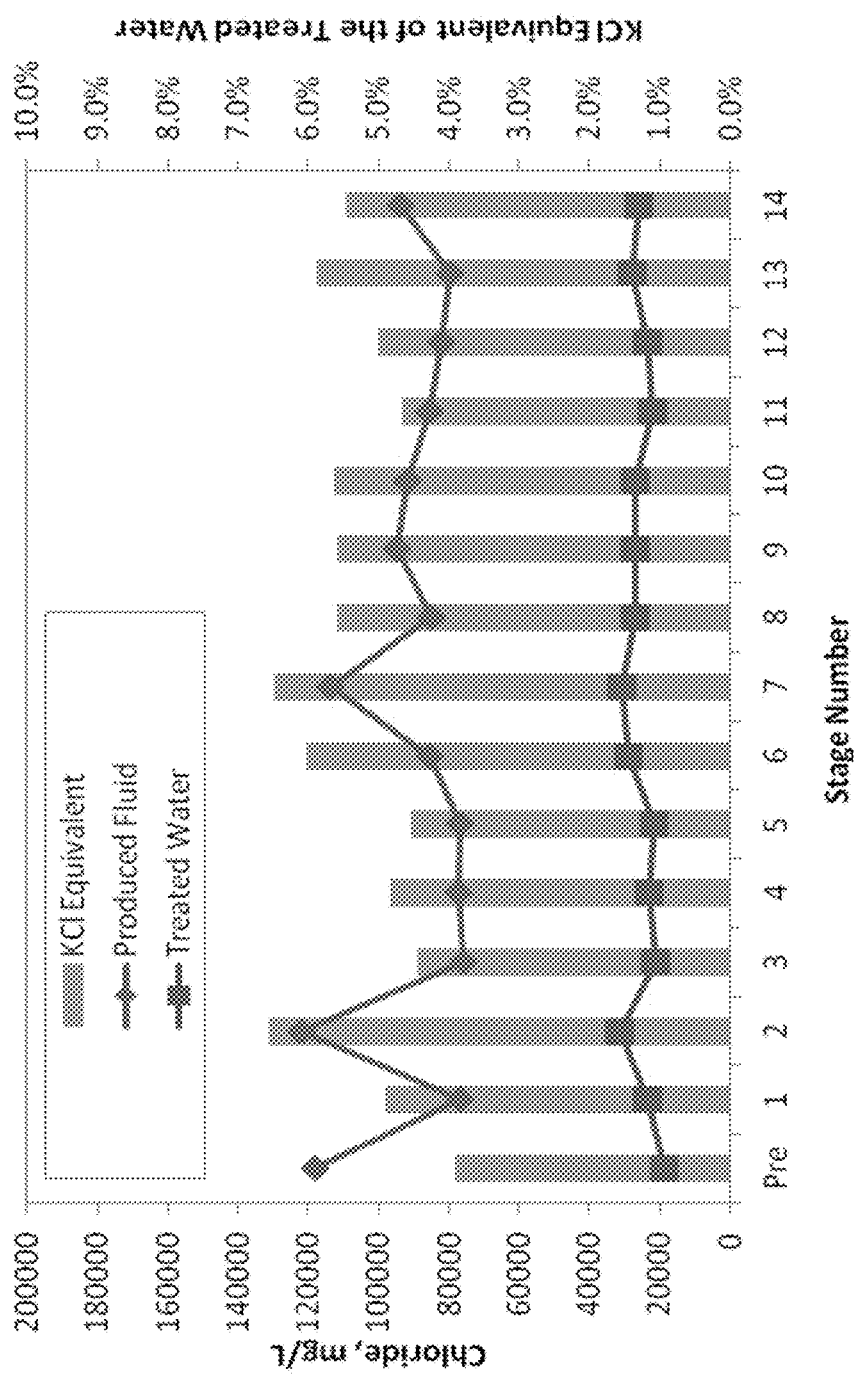
FIG. 4 is an example of a graph of chloride concentration in produced fluid and blended water, and KCl Equivalent, at different stages (with KCl target of 3% to 6%).

FIG. 1 shows an example of a blending processing flow in accordance with one exemplary embodiment of the present invention. Pump 1 is associated with the Fresh Water stream, and Pump 2 is associated with the Produced Fluid stream. Prior to blending the fresh water and produced fluid, samples are collected at the storage facilities for each fluid. These storage locations could be pits or tanks or other similar means known in the art for storing fluids. In one embodiment, these samples may be analyzed at an on-site lab to determine chloride and boron levels in parts per million (ppm), although other measurement units may be used.

The process begins by turning on Pumps 1 and 2 and adjusting the speed of each pump (e.g., RPM1, RPM2) to match pre-defined ratios of Fresh Water (FW) to Produced Fluid (PF) need for a blended outlet flow rate ($Q_{TT}$), as follows:

| % FW:% PF |
|---|
| 50:50 |
| 60:40 |
| 75:25 |
| 80:20 |
| 85:15 |
| 90:10 |

For example, if a total flow rate ($Q_{TT}$) out of the blending process is defined as needing to be 40 barrels/minute (BPM), the Current Flow Rate of Fresh Water ($Q_{CF}$) and Current Flow Rate of Produced Fluid ($Q_{CP}$), as measured by Flow Meter 1 (FM1) and Flow Meter 2 (FM2), would be set as follows by adjusting the speed of each pump:

| % FW:% PF | $Q_{CF}$ (bpm) | $Q_{CP}$ (bpm) |
|---|---|---|
| 50:50 | 20 | 20 |
| 60:40 | 24 | 16 |
| 75:25 | 30 | 10 |
| 80:20 | 32 | 8 |
| 85:15 | 34 | 6 |
| 90:10 | 36 | 4 |

As each flow rate ratio is stabilized, two sets of samples of the blended water are obtained at Sample Point 3 (SP3) after the blending chamber. One set of samples is analyzed on-site for chloride and boron levels, and calculations are done to provide KCl Equivalency values (in %) for each of the blended sample ratios. This enables the end-user to identify a recommended blend ratio based upon the targeted KCl Equivalency range for clay stabilization (as disclosed in more detailed in the attached appendix).

The second set of samples may be sent off-site for independent gel compatibility testing to determine the desired blend ratio based upon the gel products of choice and the various levels of chlorides and boron in the blended water. During the period of selection of the blend ratio for the fracturing operation, circulation of the unblended raw produced fluid may be performed to provide homogenous chloride levels once the fracture operation stages begin.

Upon determination of the desired FW:PF blend ratio, the waters/fluids are blended on a stage-by-stage volumetric "batch" basis to prepare the blended water for the hydraulic fracturing operation. During each stage of blending, the volumetric flow rates and volumes are recorded for each inlet flow stream (FW and PF) to hold the blend ratio steady, as was defined by the KCl Equivalency target but subject to the predefined boron level maximum ($B_T$) in the blended water. For each stage "batch" of blended water, samples are obtained at the blending chamber outlet or at each storage tank to define and check chloride and boron levels, and to recalculate the actual KCl Equivalency value along with a check on the boron level maximum value in case the fracture fluid design needs to be adjusted for adequate cross linking delay times and gel constituent mixtures. In addition, samples of the unblended produced fluid (PF) are obtained and checked at the on-site lab for fluctuations in chloride and boron levels. Examples of this test data are shown in FIGS. 2-5, and may be used for adjustment of blend ratios as needed.

The pre-stage "batch" blending process is repeated for each stage of the gel-based hydraulic fracturing operation to assure compatibility with respect to KCl equivalency targets and maximum boron levels ($B_T$) in the blended waters.

The calculations for the hydraulic fracturing fluid blending process are as follows. For the calculation of KCL (Potassium Chloride) Equivalent, one molecule of KCl consists of one molecule of K (Potassium) and one molecule of Cl (Chloride). The molecular weight for K is 39 g/mol, while the molecular weight for Cl is 35.5 g/mol, so the molecular weight for KCl is 74.5 (39+35.5) g/mol. Assuming the density of the fluid is at 1000 g/L, for a known chloride concentration $C_{Cl}$ (ppm or mg/L), the KCl equivalent can be calculated based on the following equation:

$$KCl\ Equivalent(\%) = \frac{74.5\frac{g}{mol}}{35.5\frac{g}{mol}} \times C_{Cl}\frac{mg}{L} \times 100 =$$

$$\frac{74.5}{35.5} \times C_{Cl} \times \frac{1\ mg}{1\ L \times 1000\frac{g}{L} \times 1000\frac{mg}{g}} \times 100 = 0.00020986 \times C_{Cl}(\%)$$

In a specific gel-frac design process for hydraulic fracturing, the following parameters are established for a particular design:

Target Flow Rate Total, $Q_{TT}$
Target KCl Equivalent, $KCl_T$
Target KCl Equivalent Maximum, $KCl_{max}$
Target KCl Equivalent Minimum, $KCl_{min}$
Target Boron Level Maximum, $B_T$ The following parameters are monitored in real-time to ensure the quality of the water meets the above targets:

Current Flow Rate of Produced Fluid, $Q_{CP}$
Current Flow Rate of Fresh Water, $Q_{CF}$
Current Fresh Water Chloride Level, $C_{CF}$
Current Produced Fluid Chloride Level, $C_{CP}$
Current Blended Water Chloride Level, $C_{CB}$
Current Fresh Water Boron Level, $B_{CF}$ Current Produced Fluid Boron Level, $B_{CP}$
Current Blended Water Boron Level, $B_{CB}$ After obtaining these parameters, the Current Blend Rate Produced ($P_{CP}$) and Current Blended Water KCl Equivalent ($KCl_{CB}$) can be solved through the following equations:

$$P_{CP} = \frac{Q_{CP}}{Q_{CF} + Q_{CP}} \times 100 (\%)$$

$$KCl_{CB} = 0.00020986 \times C_{CB} (\%)$$

The blending process may lead to elimination (such as precipitation) or generation (such as dissolution from precipitation) of boron or chloride into the blended water solution. Blending coefficients ($R_B$ and $R_C$) are defined to evaluate the effects of elimination or generation on boron and chloride during the blending process.

$$R_B = \frac{B_{CB}}{B_{CF} \times \left(1 - \frac{P_{CP}}{100}\right) + B_{CP} \times \frac{P_{CP}}{100}}$$

$$R_C = \frac{C_{CB}}{C_{CF} \times \left(1 - \frac{P_{CP}}{100}\right) + C_{CP} \times \frac{P_{CP}}{100}}$$

If $R_B$ or $R_C < 1$, part of the boron or chloride is eliminated (precipitated) from the solution through the blending process. If $R_B$ or $R_C = 1$, boron or chloride level in the solution is not affected the blending process. If $R_B$ or $R_C > 1$, part of the boron or chloride is dissolved (from solid) into the solution through the blending process.

In the control process, KCl has the primary priority over boron. In another words, the adjustment of the blend rate aims at achieving the target KCl equivalent ($KCl_T$) by adjusting the fresh water and produced water flow rates, $Q_{CF}$ and $Q_{CP}$ respectively to maintain a constant ratio. If the boron level after the adjustment ($B_A$) is over the maximum boron allowance ($B_T$), notification can be made to the user or fracturing operator that the process needs boron inhibitor to ensure enough delay for the cross linking of the gel.

To meet the target KCl equivalent, the blend rate should follow the following equation:

$$\left[C_{CF} \times \left(1 - \frac{P_{TP}}{100}\right) + C_{CP} \times \frac{P_{TP}}{100}\right] \times R_C \times 0.00020986 = KCl_T$$

Solve the equation for $P_{TP}$, $$P_{TP} = \frac{\frac{KCl_T}{R_C \times 0.00020986} - C_{CF}}{C_{CP} - C_{CF}} \times 100$$

All other unknown parameters will then be solved by the following equations:

$$Q_{TP} = Q_{TT} \times \frac{P_{TP}}{100}$$

$$Q_{TF} = Q_{TT} - Q_{TP}$$

$$B_A = \left[B_{CF} \times \left(1 - \frac{P_{TP}}{100}\right) + B_{CP} \times \frac{P_{TP}}{100}\right] \times R_B$$

In several embodiments, notifications are provided during operation of the system as follows:

| Current Status | |
|---|---|
| $KCl_{CB} > KCl_{max}$, $B_{CB} > B_T$ | KCl Over Upper Limit; Boron Over Upper Limit |
| $KCl_T < KCl_{CB} \leq KCl_{max}$, $B_{CB} > B_T$ | KCl Over Target Limit; Boron Over Upper Limit |
| $KCl_{CB} = KCl_T$, $B_{CB} > B_T$ | KCl At Target Limit; Boron Over Upper Limit |
| $KCl_{min} \leq KCl_{CB} < KCl_T$, $B_{CB} > B_T$ | KCl Under Target Limit; Boron Over Upper Limit |
| $KCl_{CB} < KCl_{min}$, $B_{CB} > B_T$ | KCl Under Lower Limit; Boron Over Upper Limit |
| $KCl_{CB} > KCl_{max}$, $B_{CB} \leq B_T$ | KCl Over Upper Limit; Boron Under Upper Limit |
| $KCl_T < KCl_{CB} \leq KCl_{max}$, $B_{CB} \leq B_T$ | KCl Over Target Limit; Boron Under Upper Limit |
| $KCl_{CB} = KCl_T$, $B_{CB} \leq B_T$ | KCl At Target Limit; Boron Under Upper Limit |
| $KCl_{min} \leq KCl_{CB} < KCl_T$, $B_{CB} \leq B_T$ | KCl Under Target Limit; Boron Under Upper Limit |
| $KCl_{CB} < KCl_{min}$, $B_{CB} \leq B_T$ | KCl Under Lower Limit; Boron Under Upper Limit |
| Actions to Take | |
| Blend Water at $Q_{TP}$ bbls/min Produced Fluid and $Q_{TP}$ bbls/min Fresh Water Projected Status | |
| $B_A \leq B_T$ | KCl At Target Level; Boron Under Upper Limit |
| $B_A > B_T$ | KCl At Target Level; Boron Over Upper Limit, Need Boron Inhibitor |

Figure 6:
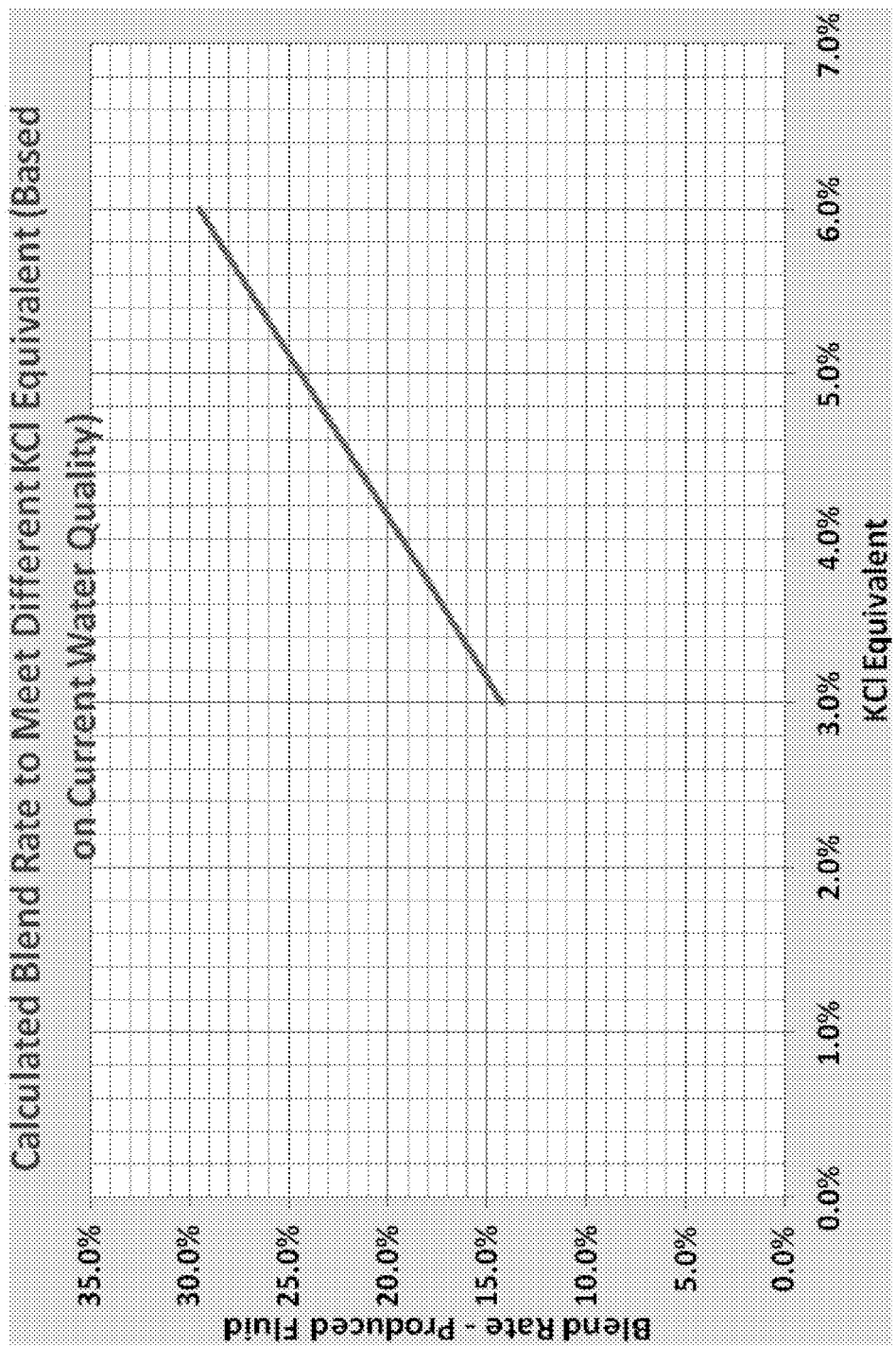
FIG. 6 is an example of a graph of calculated blend rate to meet different KCL Equivalents.
Figure 7:
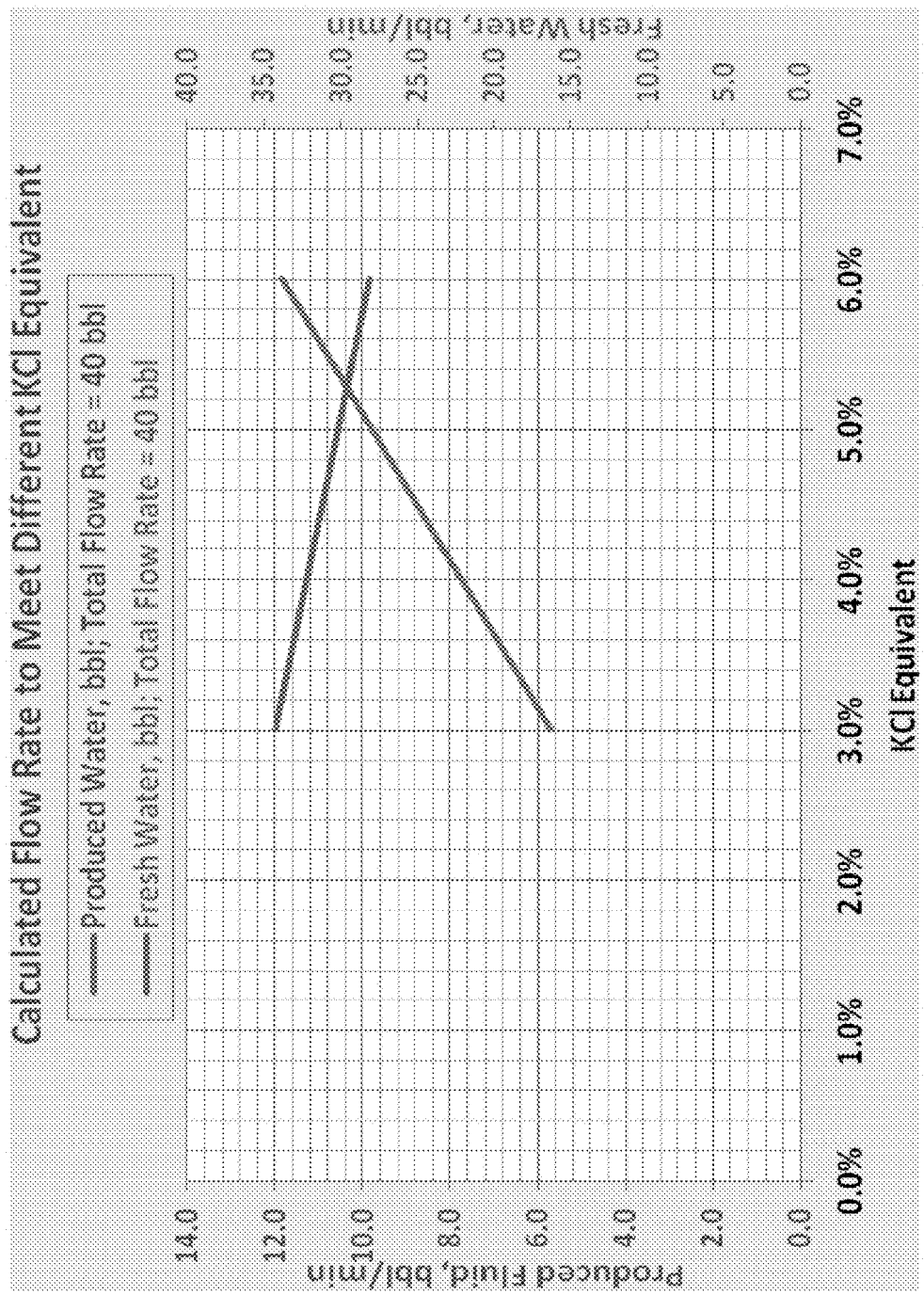
FIG. 7 is an example of a graph of calculated flow rates to meet different KCL Equivalents.

Graphs for blend rate and flow rate are automatically generated as shown in FIGS. 6 and 7. The user can use those graphs as quick references when or if they desire a different target KCl Equivalent.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for blending fluids for hydraulic fracturing, comprising:
   a blending chamber configured to receive and blend a fresh water input and a produced fluid input into a blended water output; and
   a blended water output sample point;
   wherein an actual boron concentration for the blended water output is determined from one or more samples obtained at the blended water output sample point; and
   further wherein the amount of fresh water input and the amount of produced fluid input are determined based upon a target Potassium Chloride Equivalency value or range for the blended water output.

2. The system of claim 1, further comprising a fresh water input sample point upstream of the blending chamber.

3. The system of claim 1, further comprising a produced fluid input sample point upstream of the blending chamber.

4. The system of claim 1, further wherein the amount of fresh water input and the amount of produced fluid input are determined upon a chloride concentration in the fresh water input and a chloride concentration in the produced fluid input.

5. The system of claim 1, wherein an actual Potassium Chloride Equivalency value for the blended water output is determined from one or more samples obtained at the blended water output sample point.

6. The system of claim 5, wherein the amount of the fresh water input and the amount of the produced fluid input are adjusted if the actual Potassium Chloride Equivalency value is not substantially equal to the target Potassium Chloride Equivalency value or within the target Potassium Chloride Equivalency range.

7. The system of claim 1, wherein the blended water output is produced on a batch basis for a stage in a hydraulic fracturing operation.

8. The system of claim 1, wherein the blended water output is produced for injection in an injection well.

* * * * *